United States Patent

DiTirro

[15] 3,658,082
[45] Apr. 25, 1972

[54] DUAL PRESSURE REGULATOR

[72] Inventor: Domenic A. DiTirro, Silver Lake, Ohio

[73] Assignee: International Basic Economy Corporation, New York, N.Y.

[22] Filed: Mar. 23, 1970

[21] Appl. No.: 21,623

[52] U.S. Cl. .................................137/116.5, 137/502.26
[51] Int. Cl. ..................................................G05d 11/00
[58] Field of Search ...........137/116.3, 116.5, 505.26, 484.8

[56] References Cited

UNITED STATES PATENTS

| | | | |
|---|---|---|---|
| 3,448,765 | 6/1969 | McKinney | 137/513.5 |
| 3,240,223 | 3/1966 | Vander Horst | 137/116.5 |
| 2,747,599 | 5/1956 | Watson | 137/116.5 |
| 2,806,481 | 9/1957 | Faust | 137/116.5 |
| 2,879,783 | 3/1959 | Taplin | 137/116.5 |
| 3,068,883 | 12/1962 | Brumm | 137/116.5 |
| 2,830,607 | 4/1958 | Greenland et al. | 137/116.5 X |
| 3,425,434 | 2/1969 | Strickland et al. | 137/116.3 X |
| 3,468,341 | 9/1969 | Newcomb et al. | 137/116.3 X |
| 3,511,266 | 5/1970 | Phlipot | 137/505.25 X |

Primary Examiner—Samuel B. Rothberg
Assistant Examiner—David J. Zobkiw
Attorney—Schmieding & Fultz

[57] ABSTRACT

A pressure regulator for fluid systems that includes dual pressure ranges wherein a first pressure responsive controller controls pressure at a first preselected pressure value and wherein a second pressure responsive controller controls pressure at a second preselected pressure value responsive to a feedback signal to switch the pressure ranges.

13 Claims, 5 Drawing Figures

PATENTED APR 25 1972

INVENTOR.
DOMENIC A. DITIRRO
BY
Schmieding & Fultz
ATTORNEYS

INVENTOR.
DOMENIC A. DITIRRO
BY
Schmieding & Fultz
ATTORNEYS

DUAL PRESSURE REGULATOR

This invention relates generally to pressure regulators more particularly to an apparatus of this type adapted to effect regulation of a controlled flow at a plurality of pressure values.

In general, the pressure regulator of the present invention comprises a housing means which contains a valve means for modulating a regulated flow of pressurized fluid for operating components of a fluid system.

The apparatus further comprises a pressure responsive main valve operator for opening and closing said valve means responsive to variations in fluid pressure of the system. In addition, the pressure regulator comprises a dual pressure arrangement that includes a control spring for varying the bias on the main valve operator which functions in combination with a fluid biased movable control element that is exposed to a pilot flow of fluid delivered to a control chamber within the housing means.

It will now be understood that when said control chamber is depressurized the valve means controlling the main flow will operate at a first selected pressure value and when the control chamber is pressurized to vary the bias of the control spring then the valve means will control the main regulated flow at a second selected pressure value.

As another aspect of the present invention, the pressure regulator is provided with a fast dump feature which permits rapid and high volume scavenging of fluid from the system being controlled. This feature is particularly useful in increasing the speed of cycling of production machines between the above mentioned selected high and low system pressure values.

As another aspect of the present invention, the pressure regulator is provided with a normal bleed or purging relief valve arrangement which functions to automatically reduce the pressure of the system being controlled when adjusting the pressure regulator from the higher to the lower pressure setting.

As a typical application of the pressure regulator of the present invention, the device can be used to selectively connect, for example, two predetermined pressures to either of two or both outlet ports of a typical four-way valve in various combinations so as to effect various rates of actuation of a typical power cylinder operating a load.

As another typical application of the present invention, the pressure regulator can, for example, be used to establish a selected higher pressure value for the power stroke of a typical power cylinder, and the device's low pressure setting can be used to retract the cylinder with the resulting advantages that (a) the kinetic impact return of the power cylinder ram on the cylinder is greatly reduced and (b) there is a material saving in the expenditure of pressurized fluid in operating the cylinder.

As still another application of the present invention, the apparatus can be used as a conventional line mounted regulator supplying the dual pressure feature to two or more systems.

It is therefore a primary object of the present invention to provide a pressure regulator that is pilot operated so as to selectively establish a plurality of regulated pressures for plurality of system functions.

Further objects and advantages of the present invention will be apparent from the following description, reference being had to the accompanying drawings wherein a preferred form of embodiment of the invention is clearly shown.

IN THE DRAWINGS

Figure 1:
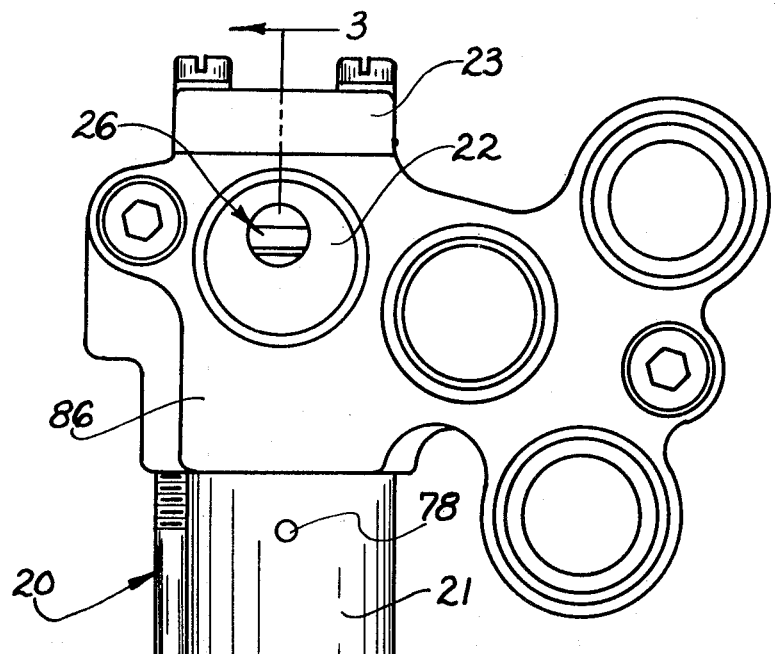
FIG. 1 is a side elevational view of a pressure regulator constructed in accordance with the present invention.

Referring in detail to the drawings, the pressure regulator of the present invention comprises a housing means indicated generally at 20 that includes a main inlet 22 and a main outlet 24 for a regulated flow of pressurized fluid, such as air, between components of a fluid system. The main flow of fluid between the ports 22 and 24 is regulated by a valve means indicated generally at 26 that includes a movable valve element 28 normally biased against a seat 30 by a valve spring 32. A valve actuating stem 34 is connected to valve element 28 by a snap ring 36 with said rod being slideably extended through a bore 38, a piston chamber 40, and an outlet chamber 41, said chambers being connected by a passage 46. The inner end of the valve actuating rod engages a main movable element 42 which is shown in the form of a piston slideably mounted in chamber 40.

Main movable element 42 is biased by a control spring 44.

Figures 3, 4:
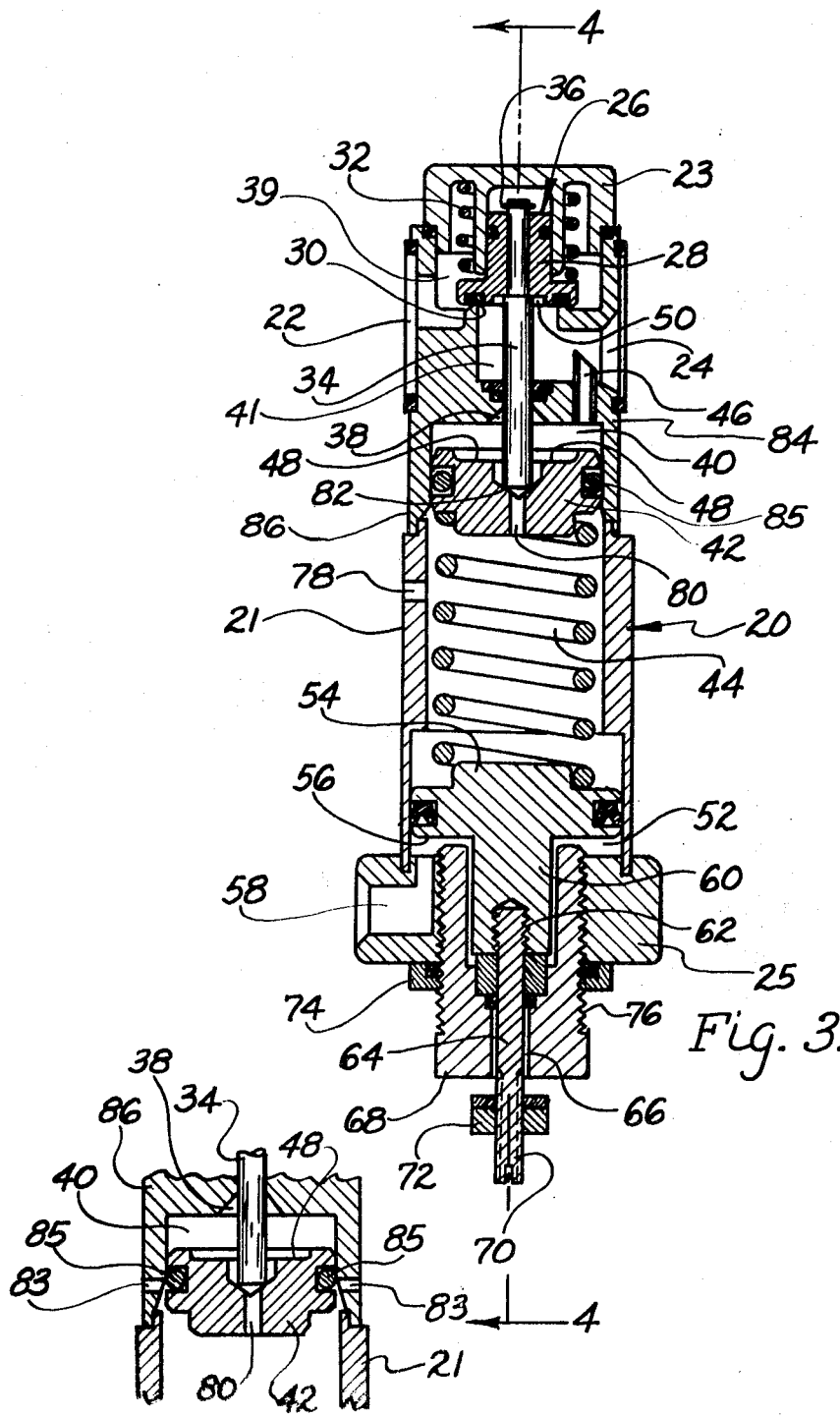
FIG. 3 is a side sectional view of the pressure regulator of the preceding figures with the section being taken along the line 3—3 of FIG. 1.
FIG. 4 is a partial side sectional view of the pressure regulator of the preceding figures with the section being taken along the line 4—4 of FIG. 3.

As seen in FIG. 3, a surface 48 on movable element 42 is exposed to the pressure of outlet 24 via chambers 40 and 41 and passage 46 such that when the pressure to the load reaches a predetermined value the force exerted on surface 48 of main movable element 42 will overcome the spring biasing forces and force of the fluid pressure on valve element surface 50, such that valve element 28 will close against its seat 30 and isolate inlet chamber 39 from outlet chamber 41.

When the pressure reflected at outlet port 24 decreases to a predetermined value, then the balance of spring and fluid pressures will open movable valve element 28 and admit pressurized fluid from inlet 22 and deliver it to outlet 24.

Referring again to FIG. 3, the apparatus includes a control chamber 52 that slideably mounts a movable control element or control piston 54 with an outer end surface 56 of the control piston being exposed to the pressure of a pilot flow of fluid introduced at a control port 58. Control piston 54 includes an upstanding portion 60 provided with a threaded bore 62 in which is mounted a piston movement control rod 64 which extends freely through a bore 66 in an end cap 68. The outer end of piston movement control rod 64 includes a threaded portion 70 onto which is adjustably mounted a stop 72.

It will now be understood that when pilot flow of fluid is introduced at control port 58 then control piston 54 will move inwardly increasing the compression of control spring 44 as well as the bias on main movable element 42.

It should be mentioned that the housing means indicated generally at 20 includes a cylindrical central portion 21 and end portions 23 and 25. Also a threaded seal ring and resilient seal 74 are provided on the threads 76 on the outside of end cap 68.

It should be mentioned that end cap 68 can be adjusted inwardly or outwardly by means of threads 76 so as to vary the normal position of control piston 54. Also stop 72 can be independently adjusted along threaded portion 70 of control rod 64 to selectively adjust the longitudinal movement of control piston 54 when control chamber 52 is pressurized.

Referring again to FIG. 3, the apparatus is provided with means for automatically bleeding or purging fluid from the system being controlled which means includes a relief valve arrangement shown at 82 which is formed by the beveled end of rod 34 and a tapered seat on piston 42. This relief valve 82 serves to bleed fluid from the system via an atmospheric vent 78. An example of such normal bleed or purging function occurs when, for example, one lowers the preset pressure by rotating adjustment knob 68 at the threads 76 so as to decrease the bias exerted by spring 44. This reduces the system pressure by releasing fluid via outlet port 24, passage 46, chamber 40, relief valve 82, passage 80 and atmospheric vent 78.

With continued reference to FIG. 3, the apparatus is further provided with a fast dump feature which permits rapid and/or high volume scavenging of fluid from the system which is particularly useful in increasing the speed of cycling of controlled equipment between the selected high and low system pressure values. For example, when the control chamber 52 is evacuated, then control piston 56 will return to its normal position, or low pressure setting, decreasing the bias on spring 44. This permits the existing system pressure to drive piston 42 downwardly, as seen in FIG. 3, to a position wherein O-ring seal 85 passes arcuate slots 83 formed in the housing wall. Slots 83 and the associated piston 42 and seal 85 are shown at the threshold of their fast dump position in FIG. 4 wherein relatively large volume of fluid can rapidly be purged from the system via port 24, passage 46, chamber 40 and arcuate slots 83. At the same time, some of the system fluid is also being released through the normal bleed passage 80 and atmospheric vent 78 as previously described.

Figure 2:
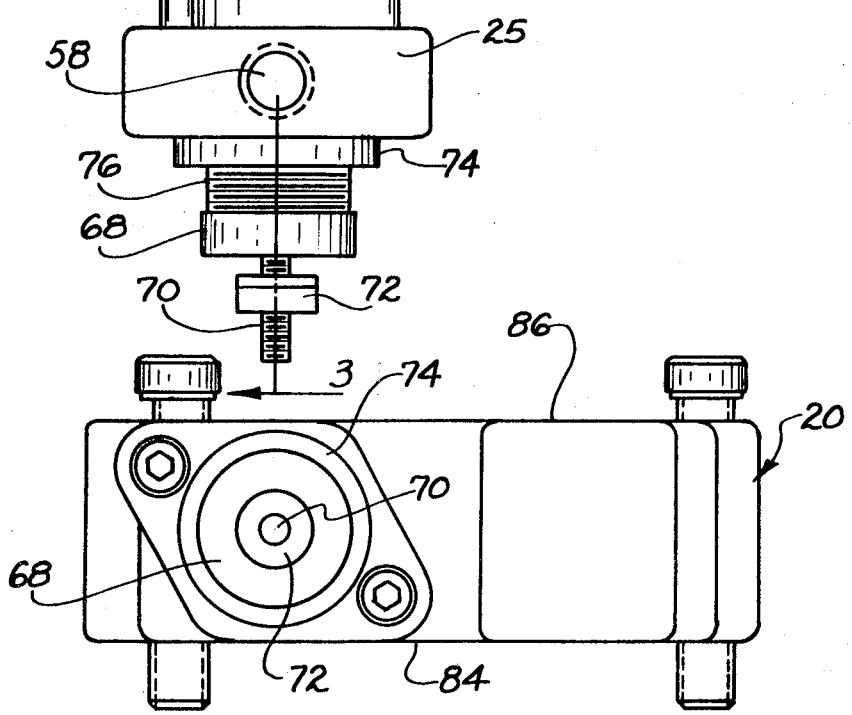
FIG. 2 is an end elevational view of the pressure regulator of FIG. 1.

It should further be mentioned that the particular envelope configuration of the housing means 20 includes the provision of the ports in flat finished interfaces 84 and 86, FIGS. 1 and 2, which permit subplate or sandwich mounting of the pressure regulator between other valves or components of the fluid system.

Figure 5:
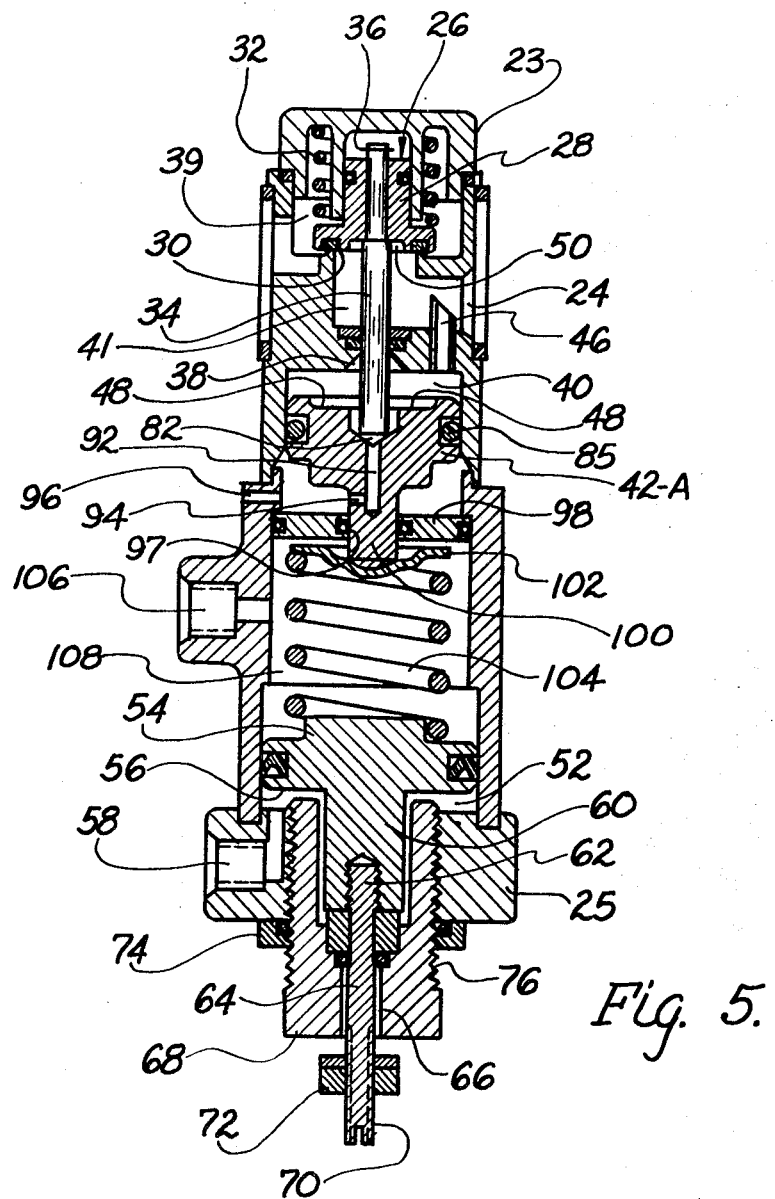
FIG. 5 is a side sectional view of a modified pressure regulator constructed in accordance with the present invention, the section being taken along a vertical plane through the centerline of the apparatus.

Reference is next made to FIG. 5 which illustrates a modified control valve constructed in accordance with the present invention. Elements of this modification which are identical to elements of the embodiment of FIGS. 1-4 are designated by identical numerals.

The pressure regulator of FIG. 5 comprises a central pilot chamber 108 between control piston 54 and wall forming member 98 and a pilot passage 106 is provided through the wall of the housing such that when pilot chamber 108 is pressurized the force exerted on control piston 54 exceeds an opposing fixed supply pressure supplied to chamber 52 thereby shifting control piston 54 downwardly, as shown in FIG. 5, so as to bias the regulator to the low pressure setting. Conversely, when the pressure in chamber 108 is released, the fixed pressure in chamber 52 shifts control piston 54 upwardly which biases spring 104 upwardly which biases spring 104 to the preselected high pressure setting.

With continued reference to FIG. 5, the modified structure further includes a modified main piston 42-A that includes a projection 100 that is extended in slideable sealed relationship through a hole 97 in wall forming member 98.

As seen in FIG. 5, the lower end of piston projection 100 engages a spring retainer 102 in force transmitting relationship with spring 104.

It should be mentioned that the embodiment of FIG. 5 includes means for bleeding system pressure via outlet 24, passage 46, piston chamber 40, relief valve 82, and passage 92, 94 and 96 to atmosphere.

It should also be mentioned that the modification of FIG. 5 includes the fast dump arrangement provided by the arcuate slots 83 that are positioned to be uncovered by O-ring seal 85 as shown in FIG. 4 and previously described in detail herein.

I claim:

1. A pressure regulator comprising, in combination, housing means including a main chamber provided with a main inlet and a main outlet and a flow path therebetween, and a control chamber including a control port connecting to a source of fluid independent of the flow path through said main chamber; valve means in said housing means for controlling a regulated flow of pressurized fluid between said main inlet and main outlet; a main movable element exposed to said regulated flow of pressurized fluid in said main chamber, said valve means being operated by said main movable element; a movable control element exposed to control fluid pressure in said control chamber; resilient means between said main movable element and said control element whereby variation in the fluid pressure in said control chamber varies the bias on said main movable element; and adjustable means for limiting the movement of said control element when said control chamber is pressurized.

2. The apparatus defined in claim 1 that includes means responsive to movement of said main movable element for rapidly releasing fluid from said regulator to the environment.

3. The apparatus defined in claim 1 wherein said housing means include vent passage means normally closed by said main movable element and connectable to said main chamber responsive to movement of said main movable element to a fast dump position.

4. The apparatus defined in claim 1 wherein said movable control element is interposed between said resilient means and said control chamber.

5. The apparatus defined in claim 1 that includes a pilot chamber means, said movable control element including a surface exposed to pressurized fluid in said pilot chamber means.

6. The apparatus defined in claim 1 wherein said movable control element includes a first side exposed to pressure in said control chamber and a second side biased by a fixed fluid pressure.

7. A pressure regulator comprising, in combination, housing means including a main chamber provided with a main inlet and a main outlet and a flow path therebetween, and a control chamber including a control port connecting to a source of fluid independent of the flow path through said main chamber; valve means in said housing means for controlling a regulated flow of pressurized fluid between said main inlet and main outlet, said valve means including a valve member and a valve seat; a valve spring normally biasing said valve member against said seat; a main movable element exposed to the pressure of said regulated flow in said main chamber; a valve actuating rod connecting said valve member with said main movable element; a movable control element exposed to control fluid pressure in said control chamber; resilient means between said main movable element and said control element whereby variation in the fluid pressure in said control chamber varies the bias on said main movable element; and adjustable means for limiting the movement of said control element when said control chamber is pressurized.

8. A pressure regulator comprising, in combination, housing means including a main chamber provided with a main inlet and a main outlet and a flow path therebetween, and a control chamber including a control port connecting to a source of fluid independent of the flow path through said main chamber; valve means in said housing means for controlling a regulated flow of pressurized fluid between said main inlet and main outlet; a main movable element exposed to said regulated flow of pressurized fluid in said main chamber, said valve means being operated by said main movable element; a movable control piston in said control chamber and including a first piston end facing said main movable element and a second piston end confronting a bore through a wall of said housing means, said control port communicating with said second piston end of said movable control piston; spring means between said first piston end and said main movable element; a piston movement control rod including an inner rod end connected to said second piston end and an outer rod end extended through said bore; and an adjustable stop on said outer rod end.

9. A pressure regulator comprising, in combination, housing means including a main chamber provided with a main inlet and a main outlet and a flow path therebetween, and a control chamber including a control port connecting to a source of fluid independent of the flow path through said main chamber; valve means in said housing means for controlling a regulated flow of pressurized fluid between said main inlet and main outlet, said valve means including a valve member and a valve seat; a valve spring normally biasing said valve member against said seat; a main movable element exposed to the pressure of said regulated flow in said main chamber; a valve actuating rod connecting said valve member with said main movable element; a movable control piston in said control chamber and including a first piston end facing said main movable element and a second piston end confronting a bore through a wall of said housing means, said control port communicating with said second piston end of said movable control piston; spring means between said first piston end and said main movable element; a piston movement control rod including an inner rod end connected to said second piston end and an outer rod end extended through said bore; and an adjustable stop on said outer rod end.

10. A pressure regulator comprising, in combination, housing means including a main chamber provided with a main inlet and a main outlet and a flow path therebetween, and a control chamber connected to a source of fluid independent of the flow path through said main chamber; valve means in said housing means for controlling a regulated flow of pressurized fluid between said main inlet and main outlet; a main movable element exposed to said regulated flow of pressurized fluid in said main chamber, said valve means being operated by said main movable element; a movable control element exposed to control fluid pressure in said control chamber; resilient means between said main movable element and said control element whereby variation in the fluid pressure in said control chamber varies the bias on said main movable element; and a pilot chamber connected to a source of pressurized fluid independent of the flow path through said main chamber, said movable control element being exposed to pilot fluid pressure in said pilot chamber whereby variation of said pilot fluid pressure shifts said movable control element between high and low operating pressure positions.

11. The apparatus defined in claim 10 that includes an adjustable means for limiting the movement of said control element when said control chamber is pressurized.

12. A pressure regulator comprising, in combination, housing means including a main chamber provided with a main inlet and a main outlet and a flow path therebetween, a control chamber including a control port, and a pilot chamber including a pilot chamber port; valve means in said housing means for controlling a regulated flow of pressurized fluid between said main inlet and main outlet; a main movable element exposed to said regulated flow of pressurized fluid in said main chamber, said valve means being operated by said main movable element; a movable control piston including a first piston and exposed to pilot fluid pressure in said pilot chamber and a second piston end exposed to control fluid pressure in said control chamber, the source of fluid for said control port and the source of fluid for said pilot chamber port being independent of flow path through said main chamber; spring means between said first piston end and said main movable element, the variation of the pilot fluid pressure in said pilot chamber serving to shift said movable control piston between high and low operating pressure positions.

13. The apparatus defined in claim 12 that includes an adjustable means for limiting the movement of said control piston when said control chamber is pressurized.

* * * * *